United States Patent [19]

Chappell et al.

[11] Patent Number: 4,464,983
[45] Date of Patent: Aug. 14, 1984

[54] PERCOLATOR INCLUDING PUMP-TYPE DISPENSER

[75] Inventors: William A. Chappell, Raytown; William J. Tweed, Kansas City; David T. Higgins, Lee's Summit, all of Mo.

[73] Assignee: Rival Manufacturing Company, Kansas City, Mo.

[21] Appl. No.: 453,787

[22] Filed: Dec. 27, 1982

[51] Int. Cl.³ ............................................. A47J 31/00
[52] U.S. Cl. ...................................... 99/312; 222/209
[58] Field of Search ................. 99/287, 279, 310, 311, 99/312, 313, 314, 315, 316, 288, 284; 222/209

[56] References Cited

U.S. PATENT DOCUMENTS

| | | | |
|---|---|---|---|
| 3,129,318 | 4/1964 | Morrison | 99/310 |
| 4,174,053 | 11/1979 | Shimizu | 222/209 |
| 4,344,548 | 8/1982 | Frazier | 222/209 |
| 4,359,174 | 11/1982 | Ikunosuke et al. | 222/209 |

*Primary Examiner*—Robert W. Jenkins
*Attorney, Agent, or Firm*—Willian, Brinks, Olds, Hofer, Gilson & Lione Ltd.

[57] ABSTRACT

A percolator/dispenser is disclosed which includes an insulated container having a hinged lid. A percolator heater, tube, and basket are mounted inside the container, and a manually operated pressure pump is included in the lid of the container. This pressure pump operates to pump air from the outside of the container to the inside of the container when operated. A normally open vent path is provided between a spout of the container and the upper portion of the interior of the container. When the manually operated pump is operated, a vent valve is controlled to close this vent path in order to seal the container such that air introduced into the container by means of the pump operates to force liquid out of the spout of the container.

15 Claims, 6 Drawing Figures

U.S. Patent  Aug. 14, 1984  Sheet 1 of 3  4,464,983
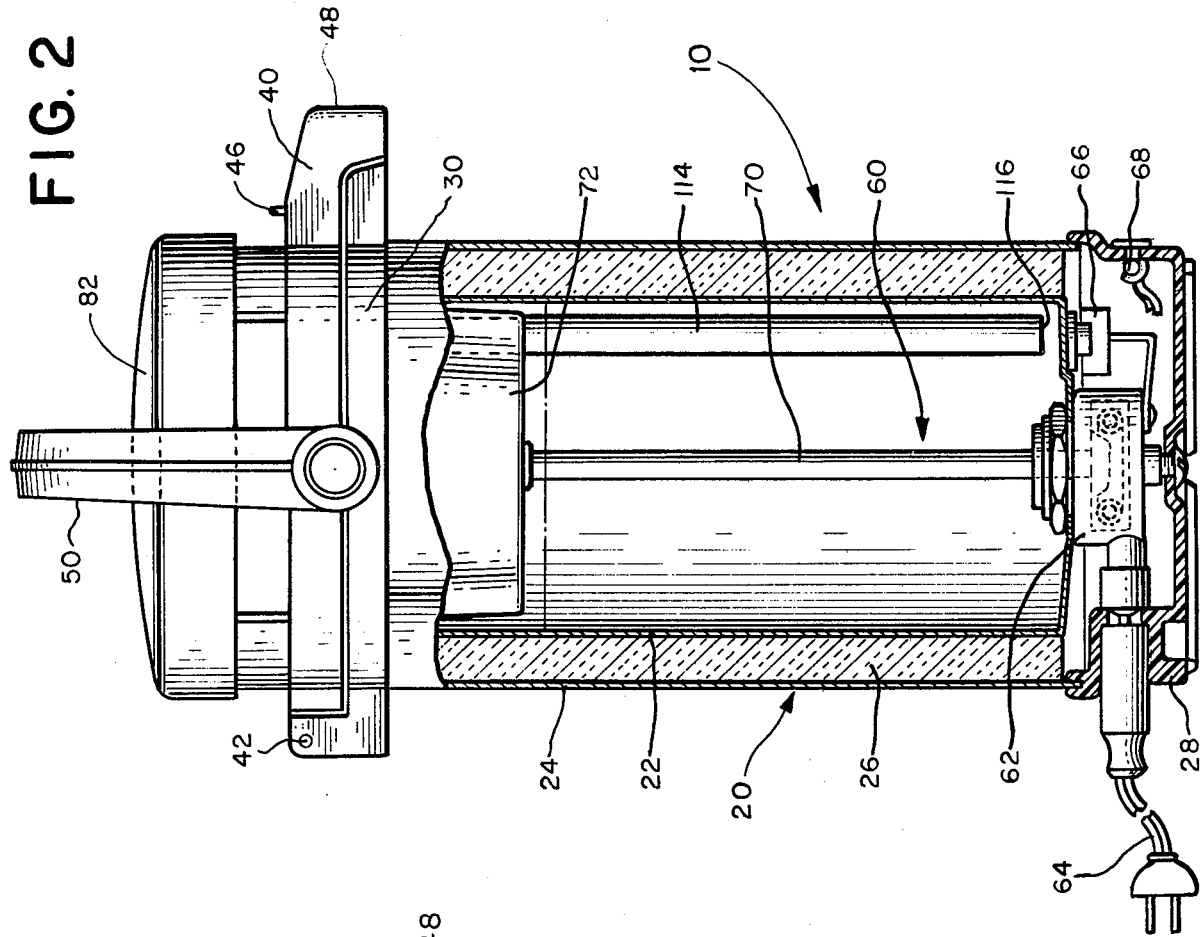
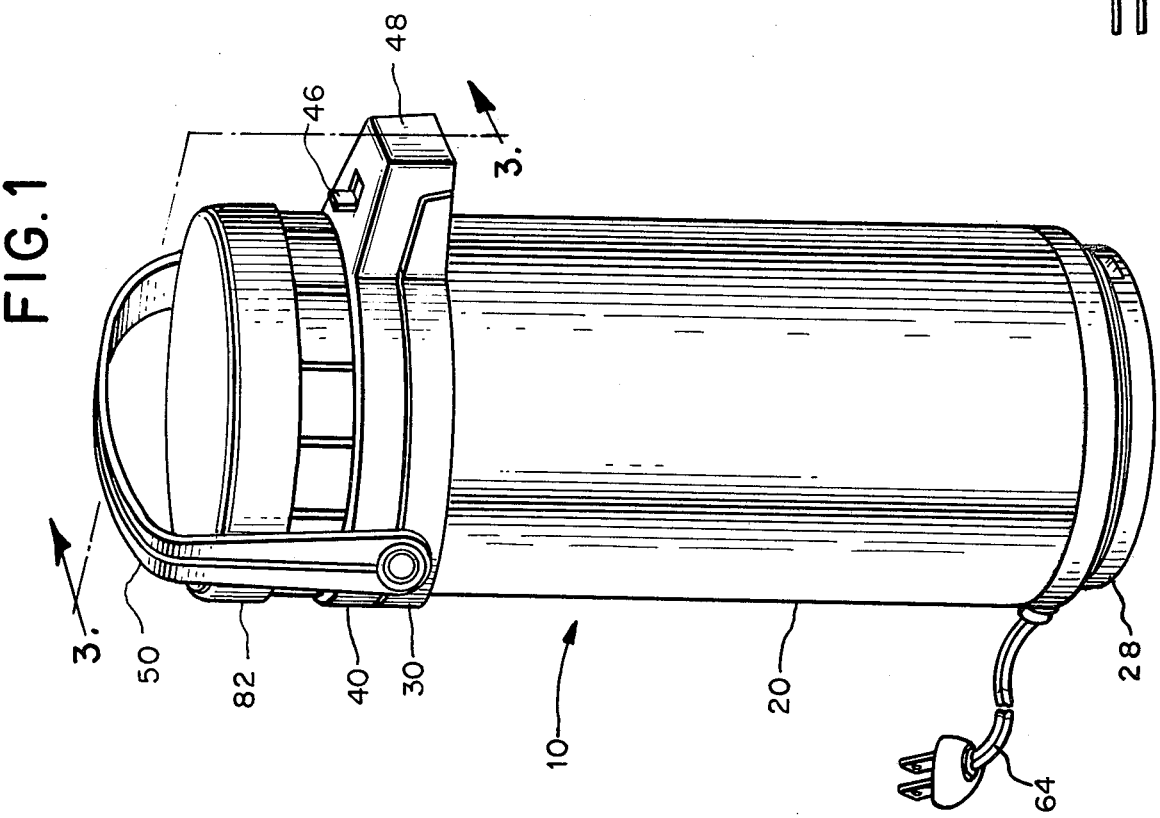

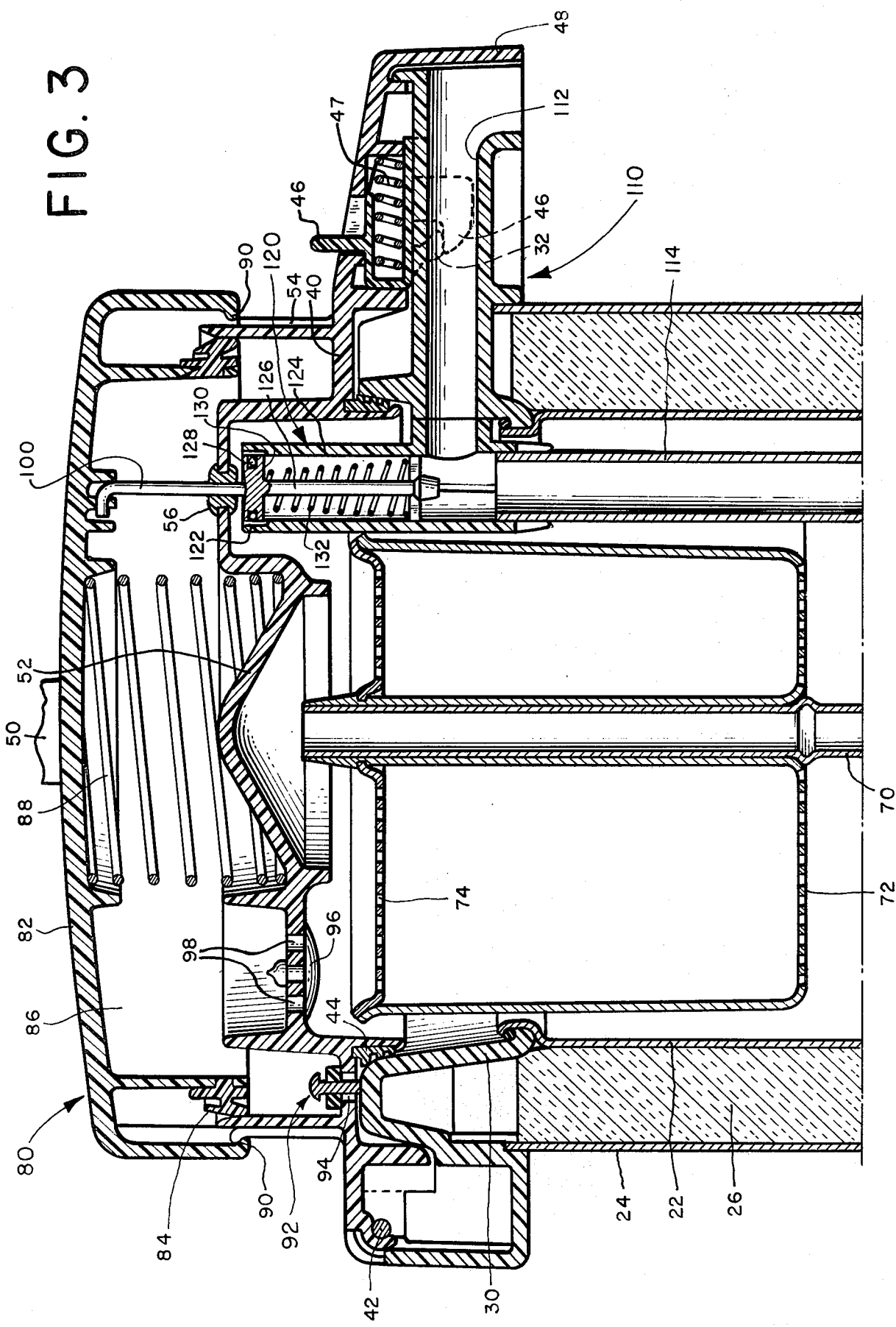

PERCOLATOR INCLUDING PUMP-TYPE DISPENSER

BACKGROUND OF THE INVENTION

The present invention relates to an improved, insulated percolator which includes a manually operated pump for dispensing liquids from the percolator.

A wide variety of products are presently available to the consumer public, including both coffee percolators and insulated containers which include manually operated pumps for dispensing liquids from the containers. However, a combined percolator/dispenser of the type described below is not presently available.

In part, this may be because of the tension between percolators and pressure-type pumps. On the surface, it would appear that percolators, which generate steam and therefore elevated pressures in use, cannot readily be combined with pressure pump-type dispensers. This is because pressure pump-type dispensers require that the vessel containing the liquid being dispensed must not be vented in order for the pressure pump to force liquid out of the vessel. In contrast, percolators generate steam in use and are therefore typically vented to atmosphere. These venting requirements of a percolator are to some extent at odds with the sealed vessel requirements of a pressure pump dispenser.

A need presently exists for an improved percolator which is insulated to allow percolated coffee to be kept hot for extended periods of time, and which includes a manually operated dispensing pump to allow liquids to be dispensed from the container without opening the container.

SUMMARY OF THE INVENTION

This invention is directed to an improved percolator/dispenser which combines a percolator with an insulated vessel that includes a pump-type dispenser. The present invention resolves the conflict between the venting requirements of the percolator and the sealing requirements of the pump dispenser.

According to this invention, a percolator/dispenser is provided which includes an insulated vessel having a spout extending between the interior and the exterior of the vessel. A perforated basket is disposed within the vessel, and percolator means are provided for causing a liquid contained in the vessel to percolate through the basket. This percolator means includes a heater and a percolator tube which extends upwardly from the heater to conduct the liquid heated by the heater to a point in the vessel above the basket. The container of this invention also includes a manually operated pump mounted to the vessel and operative to pump the liquid out of the spout.

Preferably, the manually operated pump is a pressure pump which includes means for pressurizing the vessel to force fluid out of the spout. In order to resolve the conflict between the sealing requirements of the pressure pump and the venting requirements of the percolator means, the preferred embodiment of this invention includes valve means for providing a normally open vent path between the exterior of the vessel and an upper portion of the interior of the vessel. This vent path provides a route by which steam and pressurized gas that is generated by the percolator means can escape from the vessel. This valve means preferably automatically closes the vent path when the pressure pump is operated, thereby sealing the vessel and allowing the pressure pump to pressurize the vessel to a small extent. In the preferred embodiment described below, this valve means includes a stem valve which is mechanically actuated by movement of the pressure pump.

The percolator/dispenser of this invention combines the advantages of a percolator with the advantages of an insulated container having a pump-type dispenser. Coffee can be brewed, held, and then dispensed from a single container in a simple, convenient manner. In this way, the need to transfer coffee from a percolator in which it is brewed to a dispenser in which is held and dispensed is eliminated. A further advantage of the preferred embodiment of this invention is that it allows the use of a manually operated pressure pump to dispense liquid from the container, while not interfering with normal venting of the container during percolation. This allows the advantages of percolators, which generate steam and elevated pressures in use, to be combined with pressure pump dispensers, which require a sealed vessel to work.

The invention itself, together with further objects and attendant advantages, will best be understood by reference to the following detailed description taken in conjunction with the accompanying drawings.

BRIEF DESCRIPTION OF THE DRAWINGS

FIG. 1 is a perspective view of the presently preferred embodiment of the percolator/dispenser of this invention.

FIG. 2 is a side elevational view of the percolator/dispenser of FIG. 1 in partial cutaway, showing the lid in a closed position.

FIG. 3 is a partial cross-sectional view taken along line 3—3 of FIG. 1, in which the lid is shown in the closed position.

DETAILED DESCRIPTION OF THE PRESENTLY PREFERRED EMBODIMENTS

Figure 4:
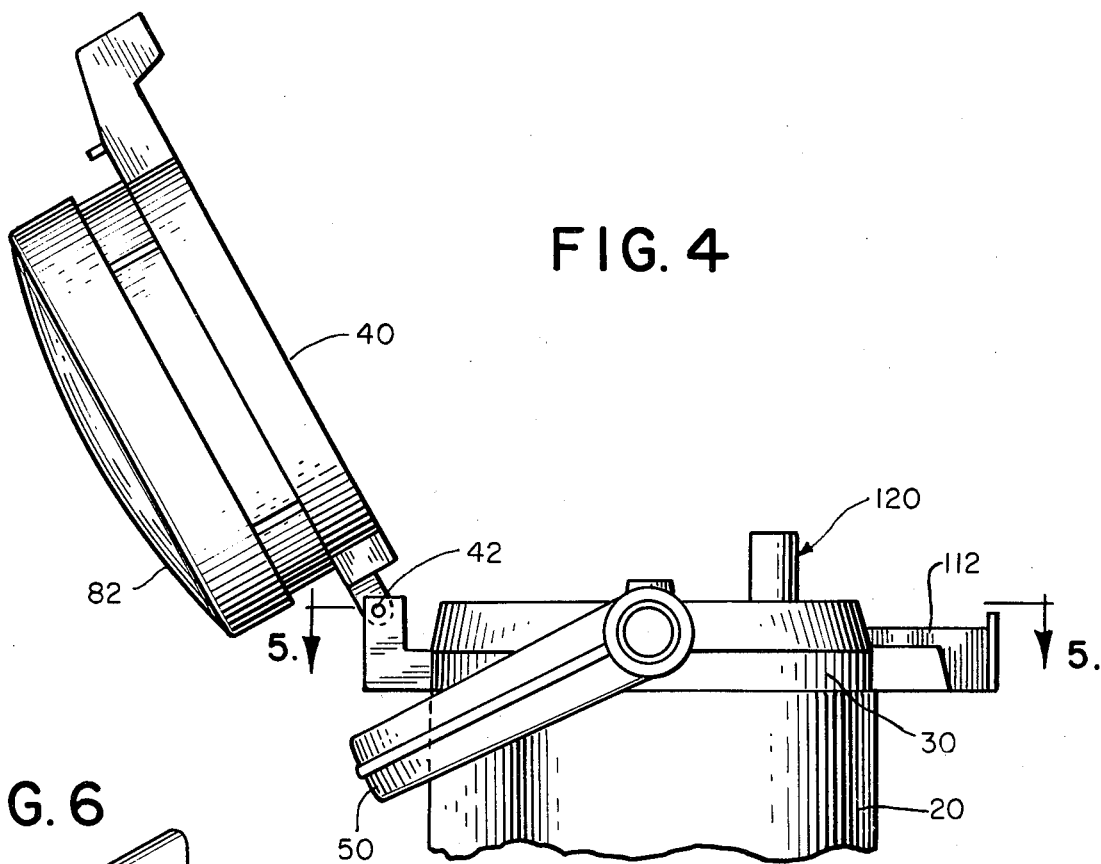
FIG. 4 is a partial side elevational view corresponding to the view of FIG. 3, in which the lid is shown in the open position.

Turning now to the drawings, FIGS. 1 through 6 show various views of a presently preferred embodiment 10 of this invention. As best shown in FIGS. 2 and 3, this embodiment 10 includes a container 20 which is made up of an outer cylindrical wall 24 which is mounted to a cylindrical base 28. The container 20 also includes an inner cylindrical wall 22 which is arranged concentrically within the outer wall 24. A foam insulation 26 is disposed between the inner and outer walls 22, 24 to act as a thermal barrier. The container 20 also includes an upper rim 30 which in this preferred embodiment is preferably formed of plastic. This upper rim 30 provides a seal at the upper ends of the inner and outer walls 22, 24, and the upper rim 30 defines a latch keeper 32.

Figure 6:
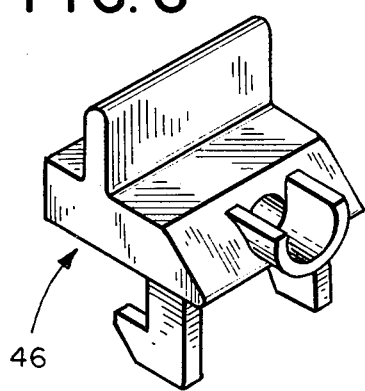
FIG. 6 is a perspective view of the latch 46 of FIG. 3.
Figure 5:
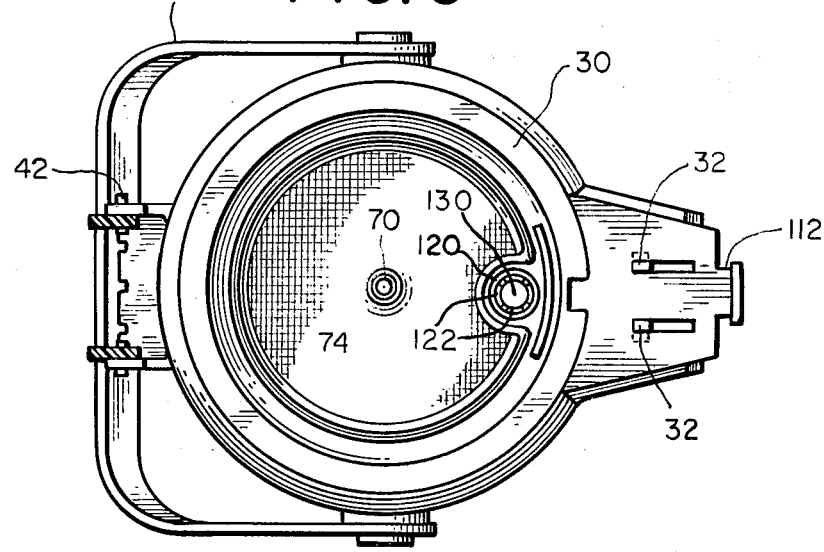
FIG. 5 is a top view taken along line 5—5 of FIG. 4.

A lid 40 is mounted to the upper rim 30 by means of a hinge pin 42. This lid 40 is provided with an annular, resilient seal ring 44 which is shaped and positioned to form a leak-proof seal against a mating surface of the upper rim 30. A latch 46 is positioned on the lid 40 adjacent the latch keeper 32; the latch 46 is best shown in FIG. 6. When the latch 46 engages the latch keeper 32 and is held in position by the latch spring 47, the lid 40 is held firmly in place against the upper rim 30 such that the seal ring 44 forms a leak-proof seal therebetween. The lid 40 also defines a deflector 48 which is positioned to deflect liquid dispensed from the container 20 downwardly. A handle 50 is pivotally mounted to the upper rim 30, and a liquid deflector 52 is defined by the central lower surface of the lid 40. The lid 40 also defines a plurality of recesses 54, the purpose of which will be described below in conjunction with the cap 82.

A percolator 60 is disposed within the container 20. This percolator 60 includes a well-type heater 62 of conventional manufacture which is mounted in the base 28 to the inner wall 22. This heater 62 is electrically powered by current which is supplied via an electrical cord 64. A thermostat 66 is mounted adjacent the lowermost surface of the inner wall 22, and is used in the conventional manner to control the operation of the heater 62. A lamp 68 is mounted within the base 28 to indicate the status of the heater 62.

A percolator tube 70 is positioned within a well defined by the heater 62 to extend vertically, upwardly from the heater 62. This percolator tube 70 defines at its lower end a baffle of conventional design which directs heated water and steam from the heater 62 into the central passageway defined by the percolator tube 70. A perforated basket 72 is mounted at the upper end of the percolator tube 70 within the container 20. This perforated basket 72 is provided with a basket top 74 which is held in place on the percolator tube 70.

The percolator 60 operates in the conventional manner to direct heated water from the heater 62 to the upper portion of the container 20. This heated water is deflected by the deflector 52 downwardly onto the basket top 74. The heated water then percolates through perforations in the basket top 74 and the basket 72. Preferably, the perforations in the basket 72 and the basket top 74 are large enough to allow water to percolate through the basket 72, but small enough to retain coffee grounds within the basket 72. The basket 72 and percolator tube 70 are configured such that they can readily be removed from the container 20 when the lid 40 is pivoted about the hinge pin 42 to the open position shown in FIGS. 4 and 5.

A pressure pump 80 is mounted to the lid 40 at the upper end of the container 20. This pressure pump 80 includes a cap 82 which is mounted to the lid 40 to move between an upper position (as shown in FIG. 3) and a lower position, in which the cap 82 approaches the lid 40. A seal ring 84 is mounted to the cap 82 to come into sealing contact with the lid 40. The cap 82, seal 84, and lid 40 cooperate to define a sealed chamber 86 therebetween. A coil spring 88 is disposed within the chamber 86 to bias the cap 82 into the upper position shown in FIG. 3. The cap 82 defines a plurality of protrusions 90 which cooperate with the recesses 54 in the lid 40 in order substantially to prevent the cap 82 from rotating on the lid 40. Also, the lid 40 is configured to cooperate with the protrusions 90 to prevent the spring 88 from pushing the cap 82 out of the engagement with the lid 40. The spring 88 is secured against rotation at one end to the lid 40 and at the other end to the cap 82. The spring 88 serves as a torsion spring to bias the cap 82 in a selected direction. The recesses 54 are provided with hooked upper ends oriented such that the spring 88 biases the protrusions 90 into these hooked upper ends. In this way, a positive twisting action is required by the user to free the cap 82 for downward motion. Accidental downward pressure on the cap 82 therefore does not cause it to move downwardly.

The pump 80 also includes an inlet valve 92 mounted on the lid 40. This inlet valve 92 is a flapvalve positioned to cover inlet apertures 94. The inlet valve 92 allows air to flow from the exterior of the container 20 into the chamber 86 when the cap 82 moves from the lower position to the upper position. The inlet valve 92 acts to prevent air from escaping through the inlet apertures 94.

The pump 80 also includes an outlet valve 96 which is positioned to cover outlet apertures 98. In this preferred embodiment, the outlet valve 96 is an umbrella valve which operates as a one-way valve, allowing air to escape from the chamber 86 to the interior of the container 20, while preventing reverse flow.

The inlet valve 92, the outlet valve 96, the cap 82, and the lid 40 cooperate to form a manually operated pressure pump. The spring 88 biases the cap 82 into the upper position shown in FIG. 3. When the cap 82 is pushed downwardly by manual pressure, air within the chamber 86 is forced out of the chamber 86, through the outlet apertures 98, into the interior of the container 20. When the cap 82 is released, the spring 88 returns the cap 82 to the upper position, and the inlet valve 92 allows air to be drawn into the chamber 86 from the exterior of the container 20.

The embodiment 10 also includes a spout 110 which is tubular in construction and includes a horizontal tube 112 which is joined and sealed to a vertical tube 114 to form the spout 110. The vertical tube 114 defines a lower end 116 positioned near the lower surface of the inner wall 22. Liquid which is forced into the vertical tube 114 at the lower end 116 is discharged from the horizontal tube 112 against the deflector 48.

A vent valve 120 is also included in the embodiment 10. This vent valve 120 defines normally open vent paths 122 between the upper portion of the interior of the container 20 (above the liquid level within the container 20) and the interior of the spout 10. These vent paths 122 pass through a cylindrical valve body 124 positioned directly above the vertical tube 114. A valve stem 126 is mounted to slide within the valve body 124. The valve stem 126 defines an O-ring valve seal 128 mounted on an enlarged valve head 130 of the valve stem 126. A valve spring 132 is provided to bias the valve stem 126 upwardly to a rest position as shown in FIG. 3. In this position, the uppermost surface of the valve head 130 comes into contact with a valve actuator 100 which is mounted to the cap 82 and passes through a sealing grommet 56 mounted in the lid 40.

The vent valve 120 operates to maintain normally open vent paths 122 between the upper portion of the interior of the container 20 and the interior of the spout 110. When the valve stem 126 is in the upper position shown in FIG. 3, the valve seal 128 does not form a seal against the valve body 124. However, when the cap 82 is pushed downwardly, the valve actuator 100 moves the valve stem 126 downwardly, thereby compressing the spring 132 and creating a seal between the valve seal 128 and the valve body 124. Once the vent paths 122 are sealed off, air which is forced into the container 20 through the outlet valve 96 by the pump 80 acts to pressurize the interior of the container 20 momentarily and to force liquid to move up the vertical tube 114 and out the horizontal tube 112.

From the foregoing, it should be apparent that a percolator/dispenser has been described which provides a normally open vent path to allow the percolator to operate normally without pressurizing the container 20, yet which acts automatically to seal the container 20 when the pump 80 is used, such that movement of the cap 82 downwardly causes liquid to be dispensed out of the spout 110. In this way, the needs of both the percolator and the pressure pump with respect to venting and sealing are met in a simple and automatic manner. The percolator/dispenser of this invention provides the important advantage that coffee can be brewed by means of the percolator within the container 20, the percolator tube 70, basket 72 and basket top 74 can be removed, and then the percolator/dispenser can be used as an insulated container. Liquid such as coffee can be dispensed easily and readily without opening the container 20 by operating the pump 80.

The foregoing description has been directed to the more important features of this embodiment. The present invention is not directed to details of the percolator, to specific proportions or dimensions, or to specific materials, and such details have therefore been omitted. However, for completeness, and by way of illustration only, the embodiment described above utilizes the following construction details. The inner and outer walls 22, 24 are formed of type 304 stainless steel approximately 0.02 inches in thickness. The insulation 26 is closed cell, ridged polyurethane foam of 2 pound per cubic foot density which is foamed in place. The lid 40, cap 82, handle 50, and miscellaneous parts such as the spout 110, the basket 72, and the top 74 are molded of polypropylene. The valve stem 126 and the valve body 124 are formed of Delrin. The rest spring rate of the spring 88 is 1.5 pounds per inch and the spring 88 as installed has a spring rate of 2.6 pounds per inch. The base 28 is phenolic. The heater 62 is rated at 650 watts, cold resistance, and is similar to the percolator well sold by Vacuum Die Casting Corp. as part no. D-0-49. The percolator tube 70 is formed of aluminum, 0.25 inches in outside diameter with a wall thickness of 1/32 inch. These details are provided merely to define the presently preferred embodiment of the invention, and are not intended to limit the scope of this invention in any way.

Furthermore, it should be understood that the vent valve 120 does not have to be mechanically coupled to the cap 82. To the contrary, a ball-type check valve can be used to allow a slow pressure build-up to vent to the spout, while automatically closing and sealing the container 20 in the event of a rapid pressure build-up within the container 20 such as that occasioned by operation of the pump 80. Alternatively, a pressure release valve can be used in conjunction with a normally closed valve situated to block the spout 110. In this alternate embodiment, the normally closed valve would be opened when necessary to dispense fluids out of the spout 110.

Of course, it should be understood that a wide range of changes and modifications to the preferred embodiments described above will be apparent to those skilled in the art. For example, vacuum insulation techniques can be substituted for the foam insulation 26 of the preferred embodiment described above, or a bellows can be substituted for the pump seal ring 84 described above. Furthermore, dimensions and materials can be selected for each individual application, and other types of percolators and valves can be substituted for those shown. It is therefor intended that the foregoing detailed description be regarded as illustrative rather than limiting, and that it be understood that it is the following claims, including all equivalents, which are intended to define the scope of this invention.

We claim:

1. A percolator/dispenser comprising:
    an insulated vessel;
    a spout extending between the interior and the exterior of the vessel;
    a perforated basket inside the vessel;
    percolator means for causing a liquid contained in the vessel to percolate through the basket, said percolator means comprising:
        a heater; and
        a percolator tube extending upwardly from the heater to conduct the liquid heated by the heater to a portion of the interior of the vessel above the basket;
    a manually operated pump mounted to the vessel and operative to pump the liquid out of the spout; and
    means for providing a vent path which is open between an upper portion of the interior of the vessel and the exterior of the vessel during operation of the percolator and is closed during operation of the pump.

2. The invention of claim 1 wherein the percolator means and the basket are adapted for the percolation of coffee.

3. The invention of claim 1 wherein the pump is a pressure pump which comprises means for pressurizing the vessel to force fluid out of the spout.

4. The invention of claim 3 wherein the means for providing a vent path comprises valve means for providing a normally open vent path between the exterior of the vessel and an upper portion of the interior of the vessel, said valve means operative automatically to close the vent path when the pressure pump is operated.

5. The invention of claim 4 wherein valve means comprises a stem valve operated by the pressure pump.

6. The invention of claim 4 wherein the valve means comprises a check valve which closes only when the pressure differential across the valve exceeds a threshold value, greater than that generated by the percolator means.

7. A percolator/dispenser comprising:
    an insulated vessel;
    a spout extending between the interior and the exterior of the vessel;
    a perforated basket inside the vessel;
    percolator means, disposed within the vessel, for causing a liquid contained in the vessel to percolate through the basket;
    a cap mounted to the vessel and movable between first and second positions;
    a seal mounted between the cap and a wall of the vessel to seal a space between the cap and the wall;
    first valve means, in communication with the space, for directing air from the exterior of the vessel into the space when the cap is moved from the first position to the second position;
    second valve means, in communication with the space, for directing air from the space into the vessel when the cap is moved from the second position to the first position;
    third valve means for providing a normally open vent path between the exterior of the vessel and an upper portion of the interior of the vessel, said third valve means operative automatically to close the vent path when the cap is moved from the second to the first position in order to allow momentary pressurization of the vessel;

said first, second, and third valve means cooperating to cause liquid to be pumped out of the spout when the cap is moved from the second to the first position, while allowing the vessel to vent during normal operation of the percolator means.

8. The invention of claim 7 further comprising a spring mounted to bias the cap toward the second position.

9. The invention of claim 7 wherein the first and second valve means comprise respective flap valves.

10. The invention of claim 7 wherein the third valve means comprises a stem valve operated by the cap.

11. The invention of claim 7 wherein the third valve comprises a ball valve which closes only when the pressure differential across the valve exceeds a threshold value, greater than that generated by the percolator means.

12. The invention of claim 7 wherein the spout comprises a down tube, positioned within the vessel, such that liquid enters the spout near the bottom of the vessel.

13. The invention of claim 7 wherein the vessel comprises a container and a lid, said container and lid so dimensioned as to allow the basket to be removed from the vessel when the lid is open.

14. A percolator/dispenser comprising:
an insulated vessel which defines an upper opening;
a lid sized to seal the opening;
a percolator system positioned within the vessel, said system including a percolator tube extending between a lower and an upper point in the vessel and a heater adapted to force heated liquid up the tube;
a perforated basket mounted in the vessel below the upper point such that liquid forced up the tube percolates through the basket, said opening sized to permit removal of the basket from the vessel;
a spout extending from a point near the bottom of the interior of the vessel, up to an upper edge of the interior of the vessel, and then to the exterior of the vessel;
means for defining a normally open vent path between an upper portion of the spout and an upper portion of the interior of the vessel;
a manually operated pressure pump, included in the lid, for pumping air from the outside of the pressure vessel to the inside of the vessel, and pump comprising:
a cap mounted on the lid to define a chamber therebetween, said cap movable between an upper position and a lower position, the volume of the chamber being greater when the cap is in the upper position than when the cap is in the lower position;
a first one-way valve for passing air from the exterior of the vessel into the chamber as the cap moves to the upper position; and
a second one-way valve for passing air from the chamber into the vessel as the cap moves to the lower position; and
a vent valve, responsive to movement of the cap from the upper to the lower position, for momentarily sealing the vent path to permit momentary pressurization of the vessel and the dispensing of liquid from the spout.

15. The invention of claim 14 wherein the vent valve comprises a stem valve mechanically actuated by the cap as the cap moves away from the upper position.

* * * * *